United States Patent
Lesso

(10) Patent No.: US 11,710,475 B2
(45) Date of Patent: *Jul. 25, 2023

(54) METHODS AND APPARATUS FOR OBTAINING BIOMETRIC DATA

(71) Applicant: Cirrus Logic International Semiconductor Ltd., Edinburgh (GB)

(72) Inventor: John P. Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,938

(22) Filed: Jun. 14, 2022

(65) Prior Publication Data

US 2022/0310057 A1  Sep. 29, 2022

Related U.S. Application Data

(63) Continuation of application No. 17/212,421, filed on Mar. 25, 2021, now Pat. No. 11,393,449.

(51) Int. Cl.
| | | |
|---|---|---|
| *G10L 13/04* | (2013.01) | |
| *G06F 21/32* | (2013.01) | |
| *G10L 17/06* | (2013.01) | |
| *G10L 25/15* | (2013.01) | |
| *G10L 17/04* | (2013.01) | |

(52) U.S. Cl.
CPC ............. *G10L 13/04* (2013.01); *G06F 21/32* (2013.01); *G10L 17/06* (2013.01); *G10L 25/15* (2013.01); *G10L 17/04* (2013.01); *H04R 2460/13* (2013.01)

(58) Field of Classification Search
CPC ........ G10H 1/0091; G10H 1/043; G10H 1/00; G10H 1/125; G10H 1/12; G10H 2210/311; G10H 2250/201; G10H 2250/205; G10H 1/06; G10L 19/265; G10L 19/26; G10L 21/038; G10L 21/0388; G10L 19/0204; G10L 19/02; G10L 25/18
See application file for complete search history.

(56) References Cited

U.S. PATENT DOCUMENTS

| | | | |
|---|---|---|---|
| 5,121,428 A | 6/1992 | Uchiyama et al. | |
| 2018/0113673 A1* | 4/2018 | Sheynblat | ............... G10L 17/00 |
| 2021/0256979 A1* | 8/2021 | Zhang | ..................... H04R 1/08 |

OTHER PUBLICATIONS

Partial International Search Report and Provisional Opinion of the International Searching Authority, International Application No. PCT/GB2022/050200, dated Apr. 4, 2022.

(Continued)

*Primary Examiner* — Huyen X Vo
(74) *Attorney, Agent, or Firm* — Jackson Walker L.L.P.

(57) ABSTRACT

A method of modelling speech of a user of a headset comprising a microphone, the method comprising: receiving a first sample, from a bone-conduction sensor, representing bone-conducted speech of the user; obtaining a measure of fundamental frequency of the bone-conducted speech in each of a plurality of speech frames of the first sample; obtaining a first distribution of the fundamental frequencies of the bone-conducted speech over the plurality of speech frames; receiving, from the microphone, a second sample; determining a first acoustic condition at the headset based on the second signal; performing a biometric process based on the first distribution of fundamental frequencies and the first acoustic condition.

17 Claims, 7 Drawing Sheets

(56) References Cited

OTHER PUBLICATIONS

Kinnunen, Tomi et al.: Long-Term F0 Modeling for Text-Independent Speaker Recognition, International Conference on Speech and Computer, SPECOM, Oct. 17, 2005 (Oct. 17, 2005), pp. 567-570.

Soenmez, M K et al: "A Lognormal Tied Mixture Model of Pitch for Prosody-Based Speaker Recognition", 5th European Conference on Speech Communication and Technology. Eurospeech '97. Rhodes, Greece, Sep. 22-25, 1997; Grenoble ESCA, FR, Sep. 22, 1997 (Sep. 22, 1997), pp. 1391-1394.

Khan, Soma et al: "Pitch based selection of optimal search space at runtime: Speaker recognition perspective", Intelligent Human Computer Interaction (IHCI), 2012 4th International Conference on, IEEE, Dec. 27, 2012 (Dec. 27, 2012), pp. 1-6.

\* cited by examiner

METHODS AND APPARATUS FOR OBTAINING BIOMETRIC DATA

This application is a continuation of U.S. patent application Ser. No. 17/212,421, filed Mar. 25, 2021, which is incorporated by reference herein in its entirety.

TECHNICAL FIELD

The present disclosure relates to methods and apparatus for obtaining biometric data from personal audio devices, such as headsets and other devices worn on the head.

BACKGROUND

Speaker recognition is commonplace in many devices, such as smartphones with voice assistants and smart speakers that are able to detect the speech of an enrolled user, and then perform speech recognition to identify commands that are spoken by the enrolled user, and then act on those commands.

Some speaker recognition systems operate by extracting features from the speech signal, and then compare the extracted features with a model of an enrolled speaker's speech, which has been generated during the process of enrolment. Many such systems use MFCCs (Mel-frequency cepstral coefficients) as the extracted features. In situations where high reliability is required (for example when authorising financial transactions, or the like), it would be useful to combine the speaker recognition based on MFCCs with an alternative method of speaker recognition. In other situations, where high reliability is not required, it would be convenient to be able to use a method of speaker recognition that is fast and does not use the large amounts of computational power associated with MFCC extraction.

SUMMARY

According to a first aspect of the disclosure, there is provided a method of modelling speech of a user of a headset comprising a microphone, the method comprising: receiving, from a bone-conduction sensor, a first audio signal representing bone-conducted speech of the user; obtaining a measure of fundamental frequency (F0) or a harmonic of fundamental frequency (e.g. F1, F2 etc.) of the bone-conducted speech in each of a plurality of speech frames of the first signal; obtaining a first distribution of the fundamental frequencies or the harmonic of the fundamental frequencies of the bone-conducted speech over the plurality of speech frames; receiving, from the microphone, a second audio signal; determining a first acoustic condition at the headset based on the second signal; and performing a biometric process based on the first distribution of fundamental frequencies or a harmonic of fundamental frequencies and the first acoustic condition.

The following optional features are described with reference to the fundamental frequency but apply equally to embodiments where a harmonic of the fundamental frequency (and a distribution thereof) is used for performing the biometric process (instead of or in addition to the fundamental frequency).

The first distribution function may be a cumulative distribution function (CDF) or a probability distribution function.

The method may further comprise: determining which frames of the first signal contain voiced speech; and obtaining the measure of the fundamental frequency of the bone-conducted speech of the user from the frames that contain voiced speech.

The biometric process may be biometric enrolment. In which case, the method may further comprise forming a biometric model of the user based on the first distribution and first acoustic condition.

Forming the biometric model of the user may comprise applying a transformation to the first distribution based on the first acoustic condition. Applying the transformation to the first distribution may comprise frequency shifting the first distribution.

The biometric process may be biometric authentication. In which case, the method may comprise: comparing the first distribution with a second distribution of fundamental frequencies of bone-conducted speech of an enrolled user, the second distribution being obtained in a second acoustic condition, the first acoustic condition being within a predetermined threshold of the second acoustic condition.

The first acoustic condition may comprises one or more of a noise level or a signal to noise ratio (SNR). The first acoustic condition may be representative of the quality of the first audio signal.

Determining the first acoustic condition may comprise determining an amplitude of and/or power in the second signal from the microphone.

The microphone is preferably external to the headset, thus configured to receive ambient environmental noise as well as air-conducted sound from the user's mouth.

The bone-conduction sensor may be comprised in the headset.

The bone-conduction sensor may comprise an inertial measurement unit (IMU) or a contact microphone.

The bone-conduction sensor may be configured to mechanically couple to the user's head.

According to another aspect of the disclosure, there is provided a non-transitory machine-readable medium storing instructions which, when executed by processing circuitry, cause an electronic apparatus to implement a method described above.

According to another aspect of the disclosure, there is provided a device comprising: an input for receiving, from a bone-conduction sensor, a first audio signal representing bone-conducted speech of a user and for receiving, from a microphone, a second signal; one or more processors configured to: obtain a measure of fundamental frequency or a harmonic of fundamental frequency (e.g. F1, F2 etc.) of the bone-conducted speech in each of a plurality of speech frames of the first signal; obtain a first distribution of the fundamental frequencies or harmonics of fundamental frequencies of the bone-conducted speech over the plurality of speech frames; determine a first acoustic condition at the headset based on the second signal; and perform a biometric process based on the first distribution of fundamental frequencies or harmonics of fundamental frequencies and the first acoustic condition.

The following optional features are described with reference to the fundamental frequency but apply equally to embodiments where a harmonic of the fundamental frequency (and a distribution thereof) is used for performing the biometric process (instead of or in addition to the fundamental frequency).

The first distribution function may be a cumulative distribution function (CDF) or a probability distribution function.

The one or more processors may be further configured to: determine frames of the first signal contain voiced speech;

and obtain the measure of the fundamental frequency of the bone-conducted speech of the user from the frames that contain voiced speech.

The biometric process may be biometric enrolment. In which case, the one or more processors may be configured to: form a biometric model of the user based on the first distribution and first acoustic condition.

Forming the biometric model of the user may comprise applying a transformation to the first distribution based on the first acoustic condition.

The one or more processors may be configured to apply the transformation to the first distribution by frequency shifting the first distribution.

The biometric process may be biometric authentication. In which case, the one or more processors configured to: compare the first distribution with a second distribution of fundamental frequencies of bone-conducted speech of an enrolled user, the second distribution being obtained in a second acoustic condition, the first acoustic condition being within a predetermined threshold of the second acoustic condition.

The first acoustic condition may comprise a noise level or a signal to noise ratio (SNR). The first acoustic condition may be representative of the quality of the first audio signal.

The first acoustic condition may comprise determining an amplitude of and/or power in the second signal from the microphone.

The device may further comprise the microphone. The microphone is preferably external to the device.

The device may further comprise the bone-conduction sensor. The bone-conduction sensor may comprise an inertial measurement unit (IMU) or a contact microphone. The bone-conduction sensor may be configured to mechanically couple to the user's head when the device is worn by the user.

According to another aspect of the disclosure, there is provided a method comprising: detecting that the headset is being worn by a user; detecting that the user is speaking; while the headset is being worn and the user is speaking: receive a first signal from a bone-conduction sensor representing bone-conducted speech of the user; obtain a measure of a fundamental frequency or a harmonic of fundamental frequency (e.g. F1, F2 etc.) of the bone-conducted speech of the user in each of a plurality of speech frames of the first signal; and on determining that a threshold number of speech frames containing bone-conducted speech of the user have been obtained: obtain a first distribution of the fundamental frequency or a harmonic of fundamental frequency of the bone-conducted speech in the plurality of speech frames; and output the first distribution for use in a biometric process.

The following optional features are described with reference to the fundamental frequency but apply equally to embodiments where a harmonic of the fundamental frequency (and a distribution thereof) is used for performing the biometric process (instead of or in addition to the fundamental frequency).

The method may further comprise: determining a degree of accuracy of the first distribution based on the number of speech frames contained in the first distribution.

The method may further comprise determining the degree of accuracy of the first distribution based on an acoustic condition at the headset.

The method may further comprise outputting the degree of accuracy with the first distribution.

The method may further comprise: updating the first distribution while the headset is being worn and the user is speaking; and outputting the updated first distribution.

The method may further comprise: determining which frames of first signal contain voiced speech; and obtaining the measure of the fundamental frequency of the speech of the user from the frames that contain voiced speech.

The method may further comprise: performing the biometric process.

The bone-conduction sensor may comprise an inertial measurement unit (IMU) or a contact microphone.

According to another aspect of the disclosure, there is provided a device comprising: an input for receiving, from a bone-conduction sensor, a first signal representing bone-conducted speech of the user; and one or more processors configured to: detecting that the headset is being worn by a user; detecting that the user is speaking; while the headset is being worn and the user is speaking: obtain a measure of a fundamental frequency or a harmonic of fundamental frequency (e.g. F1, F2 etc.) of the bone-conducted speech of the user in each of a plurality of speech frames of the first signal; and on determining that a threshold number of speech frames contain bone-conducted speech of the user have been obtained: obtain a first distribution of the fundamental frequency or a harmonic of fundamental frequency of the bone-conducted speech in the plurality of speech frames; and output the first distribution for use in a biometric process.

The following optional features are described with reference to the fundamental frequency but apply equally to embodiments where a harmonic of the fundamental frequency (and a distribution thereof) is used for performing the biometric process (instead of or in addition to the fundamental frequency).

The one or more processors may be configured to: determine a degree of accuracy of the first distribution based on the number of speech frames contained in the first distribution.

The one or more processors may be configured to: determine the degree of accuracy of the first distribution based on an acoustic condition at the headset.

The one or more processors may be configured to: output the degree of accuracy with the first distribution.

The one or more processors may be configured to: update the first distribution while the headset is being worn and the user is speaking; and output the updated first distribution.

The one or more processors may be further configured to perform the biometric process.

The device may comprise the bone-conduction sensor. The bone-conduction sensor may comprise an inertial measurement unit (IMU) or a contact microphone.

According to another aspect of the disclosure, there is provided a non-transitory machine-readable medium storing instructions which, when executed by processing circuitry, cause an electronic apparatus to implement a method.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Figure 1:
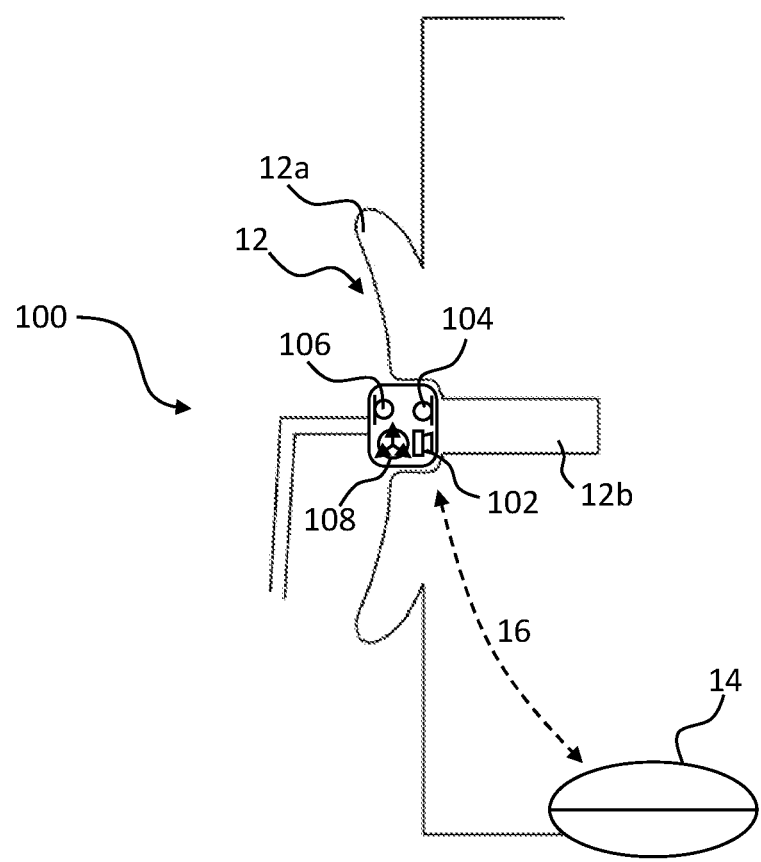
FIG. 1 illustrates an example of a personal audio device being worn by a user.

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

In this disclosure, the term "speaker recognition" is used to refer to a process in which information is obtained about the identity of a speaker. For example, this process may involve determining whether or not the speaker is a specific individual (speaker verification), or may involve identifying the speaker, for example from a group of enrolled speakers (speaker identification). The term "speech recognition" is used to refer to a process in which information is obtained about the content of speech, for example in order to be able to determine what the speaker is saying.

Embodiments of the present disclosure provide improved methods and devices for extracting biometric data, comprising one or more features which may be used as part of a biometric process. Some examples of biometric processes include biometric enrolment and biometric authentication. Enrolment comprises the acquisition and storage of biometric data which is characteristic of an individual. In the present context, such stored data may be known as a "voice print" indicative of the speech of the user. Authentication comprises the acquisition of biometric data from an individual, and the comparison of that data to the stored data of one or more enrolled or authorised users. A positive comparison (i.e. the acquired data matches or is sufficiently close to a stored voice print) results in the individual being authenticated. For example, the individual may be permitted to carry out a restricted action, or granted access to a restricted area or device. A negative comparison (i.e. the acquired data does not match or is not sufficiently close to a stored voice print) results in the individual not being authenticated. For example, the individual may not be permitted to carry out the restricted action, or granted access to the restricted area or device.

Embodiments of the present disclosure relate to the use of bone-conducted speech in biometric processes. Bone-conducted speech may be recorded using bone-conduction sensors mechanically coupled to the head of a user. Features of speech, such as a fundamental frequency (F0) or pitch period of speech of the user can be extracted or obtained from signals derived by such sensors. Embodiments may utilise such biometric data in one or more biometric processes, such as those described above. By using bone-conducted speech signals, as opposed to air-conducted speech signals to obtain F0 values for a user's voice, a more accurate biometric can be obtained that is resilient to ambient noise proximate to the user.

FIG. 1 shows a schematic diagram of a user's ear 12 and mouth 14. The user's ear 12 comprising the (external) pinna or auricle 12a, and the (internal) ear canal 12b. A bone conduction path 16 exists between the mouth and vocal cords and the ear 12, which transmits speech sound generated by the user through the bone and tissue in the user's head to the ear 12.

A personal audio device comprising an intra-concha headphone 100 (or earphone) sits inside the user's concha cavity. The intra-concha headphone may fit loosely within the cavity, allowing the flow of air into and out of the user's ear canal 12b which results in partial occlusion of the ear canal of the user. Alternatively, the headphone 100 may form a tight seal with the ear canal which may result in full occlusion.

The headphone 100 comprises one or more loudspeakers 102 positioned on an internal surface of the headphone 100 and arranged to generate acoustic signals towards the user's ear and particularly the ear canal 12b. The headphone 100 may further comprise one or more microphones 104, known as error microphone(s) or internal microphone(s), positioned on an internal surface of the earphone, arranged to detect acoustic signals within the internal volume defined by the headphone 100 and the ear canal 12b. The headphone 100 may also comprise one or more microphones 106, known as reference microphone(s) or external microphone(s), positioned on an external surface of the headphone 100 and configured to detect environmental noise (or air-conducted sound) incident at the user's ear.

The headphone 100 may be able to perform active noise cancellation (ANC), to reduce the amount of noise experienced by the user of the headphone 100. Active noise cancellation typically operates by detecting the noise (i.e. with a microphone) and generating a signal (i.e. with the loudspeaker) that has the same amplitude as the noise signal but is opposite in phase. The generated signal thus interferes destructively with the noise and so cancels or at least lessens the noise experienced by the user. Active noise cancellation may operate on the basis of feedback signals, feedforward signals, or a combination of both, i.e. a hybrid noise cancellation arrangement. Feedforward active noise cancellation utilizes the one or more microphones 106 on an external surface of the headphone 100, operative to detect the environmental noise before it reaches the user's ear. The detected noise is processed, and the cancellation signal generated so as to inversely match the incoming noise as it arrives at the user's ear thus cancelling, or at least reducing, the noise. Feedback active noise cancellation utilizes the one or more error microphones 104, also known as feedback microphones, positioned on the internal surface of the headphone 100, operative to detect the combination of the noise and the audio playback signal generated by the one or more loudspeakers 102. This combination is used in a feedback loop, together with knowledge of the audio playback signal, to adjust the cancelling signal generated by the loudspeaker 102 and so reduce or cancel the noise. The microphones 104, 106 shown in FIG. 1 may therefore form part of an active noise cancellation system, whether it be a feedforward, feedback or hybrid system implementing both feedforward and feedback ANC.

The headphone 100 may also operate in a passthrough or transparency mode in which sound incident at the microphone 106, positioned on an external surface of the headphone, is applied to the one or more loudspeakers 102 so that a user wearing the headset 100 is able to hear their ambient acoustic environment which has otherwise been occluded due to them wearing the headset 100 and therefore has ambient awareness.

In a variation, the headphone 100 may utilise the speaker 102 for one or more of feedback/feedforward/hybrid ANC, or passthrough. For example, the speaker 102 may be used as a sensor as is known in the art. The use of a speaker as a sensor is described in U.S. Pat. No. 10,506,336, the contents of which is hereby incorporated by reference in its entirety. Where the speaker 102 is used as a sensor, the internal microphone 104 may be omitted. It is noted that neither the speaker 102 nor the microphone 104 are essential to embodiments of the present disclosure.

The headphone 100 further comprises an inertial measurement unit (IMU) 108, such as an accelerometer configured to measure inertia at the ear. Due to the fit of the headphone 100 in or on the ear 12, the IMU 108 may be mechanically coupled to the user's head. As such, the IMU 108 may be configured to pick up sound associated with the user speaking, conducted through the user's head via the bone-conduction path 16, so-called bone-conducted speech. In any of the embodiments described in this application, the IMU 108 may be replaced with another bone-conduction sensor operable to receive bone-conducted speech of the user conducted via the bone-conduction path 16. An example of a bone-conduction sensor is a contact microphone. For example, the internal microphone 104 may be operable as a bone-conduction sensor in some embodiments, such as when the internal microphone 104 is mechanically coupled to the head. In which case, the IMU 108 may be omitted and the functions of the IMU 108 may be undertaken by the internal microphone 104.

In the example shown in FIG. 1, an intra-concha headphone 100 is provided as an example personal audio device. It will be appreciated, however, that embodiments of the present disclosure can be implemented on any personal audio device which is configured to be placed at, in or near the ear of a user or on the head of the user. Examples include circum-aural headphones worn over the ear, supra-aural headphones worn on the ear, in-ear headphones inserted partially or totally into the ear canal to form a tight seal with the ear canal, or mobile handsets held close to the user's ear so as to provide audio playback (e.g. during a call). Embodiments of the present disclosure may be implemented in any type of headset that comprises a bone conduction sensor. Examples include virtual reality headsets, augmented reality headsets and smart glasses to name a few. In such examples, a bone conduction sensor (such as the IMU 108 or a contact microphone) may be positioned at any location on the head, such as the nose bridge, the jaw, or the top of the head, provided they are able to pick up bone-conducted speech of the user.

Figure 2:
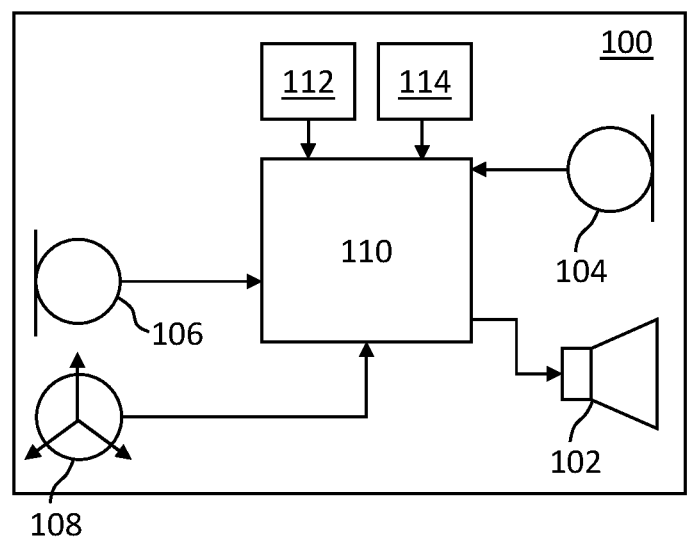
FIG. 2 is a schematic diagram illustrating the personal audio device of FIG. 1 in more detail.

FIG. 2 is a system schematic of the headphone 100. The headphone 100 may form part of a headset comprising another headphone (not shown) configured in substantially the same manner as the headphone 100. The pair of headphones (the headphone 100 and the other headphone which is not shown) may form a stereo headset.

A signal processor 110 of the headphone 100 is configured to receive microphone signals from the microphones 104, 106 and the IMU 108 and output audio signals to the loudspeaker 102. When the headphone 100 is positioned at, near or within the ear canal, the microphone 104 is occluded to some extent from the external ambient acoustic environment. The headphone 100 may be configured for a user to listen to music or audio, to make telephone calls, to deliver voice commands to a voice recognition system, and/or other such audio processing functions. The processor 110 may be configured to implement active noise cancellation (feedback and/or feedforward) and/or passthrough/transparency modes using the microphones 104, 106 and the one or more transducers 102. The processor 110 is also configured to obtain biometric data from the IMU 108 and/or the one or more microphones 104, 106, as will be explained in more detail below.

The headphone 100 further comprises a memory 112, which may in practice be provided as a single component or as multiple components. The memory 112 is provided for storing data and/or program instructions. The headphone 100 may further comprise a transceiver 114, which is provided for allowing the headphone 100 to communicate (wired or wirelessly) with external devices, such as another headphone, and/or a host device, such as a mobile device (e.g. smartphone) for example, to which the headphone 100 is coupled. Such communications between the headphone 100 and external device(s) may comprise wired communications where suitable wires are provided between left and right sides of a headset, either directly such as within an overhead band, or via an intermediate device such as a mobile device and/or wireless communications. The headphone may be powered by a battery and may comprise other sensors (not shown). It will be appreciated that methods described herein may be implemented on the headphone 100 or on a host device to which the headphone 100 is connected, or a combination of both.

As mentioned above, the IMU 108 may be an accelerometer or gyroscope. The IMU 108 may be configured to output inertial measurements to the processor 110. The IMU 108 may form part of the headphone 100 as shown in FIG. 1. Alternatively, the IMU 108 may be a separate module in communication with the headphone 100, for example, via the transceiver 112. In some embodiments, for example where the headphone 100 is implemented as a headset worn on a user's head, the IMU 108 may be positioned away from the ear of the user when worn, for example on the nose bridge of a pair of smart glasses. The IMU 108 may be used to generate one or more signals representative of motion of the headphone 100 which may be used as a proxy for motion of the head of a user upon which the headphone 100 is being worn. Examples of motion include movement (forward, back, left, right, up, down) as well as tilt in any direction. A change in movement or tilt may also be derived from signals received from the IMU 108. Vibrations due to speech of the user, conducted via the bone-conduction path 16 in the user's head, may also be picked up by the IMU 108. Thus, the IMU 108 may be used to determine one or more characteristics of the user's speech, as will be described in more detail below.

Embodiments of the present disclosure utilise bone-conducted signals picked up primarily by the IMU 108 of the headphone 100 to determine characteristics of the user's speech. These characteristics include the fundamental frequency or F0 of the user's speech. By extracting features of harmonics (such as F0) from user's bone-conducted speech, an improvement in signal-to-noise ratio is achieved, thereby improving the quality of the extracted or obtained features.

The inventors have also identified that the fundamental frequency of F0 of the user's speech is affected by the Lombard effect. The Lombard effect is the involuntary tendency of speakers to increase their vocal effort when speaking in loud noise to enhance the audibility of their voice.

Figure 3:
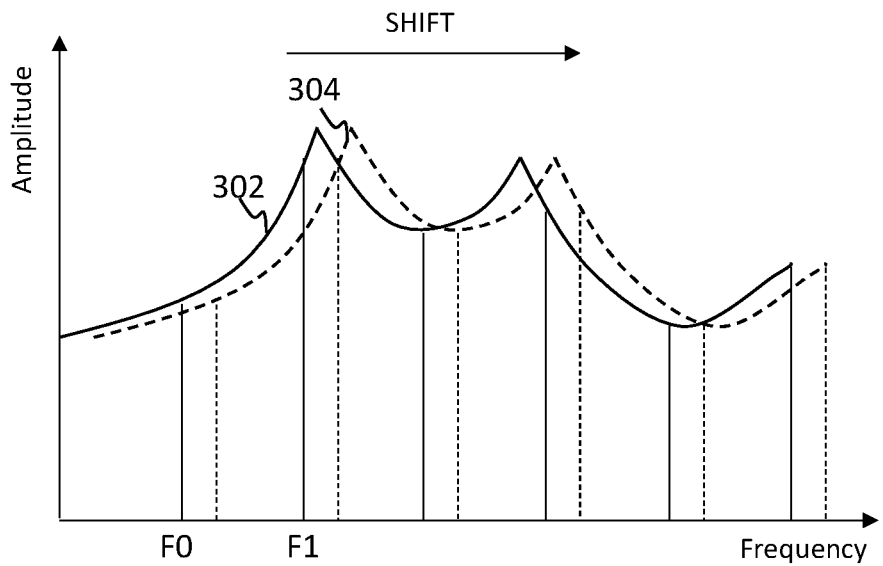
FIG. 3 is a graph illustrating changes in the spectrum of speech of varying vocal effort.

FIG. 3 graphically illustrates the change in spectrum of a user's speech due to an increase in vocal effort. A first spectrum 302 is shown during normal speech of the user and a second spectrum 304 is shown during speech of increased vocal effort. It can be seen that fundamental frequency F0 and harmonics of the user's speech shift in frequency as a function of vocal effort. As the vocal effort of the user's speech increases, so too does the fundamental frequency F0 and higher harmonics (F1, F2 etc.) of their speech.

Figure 4:
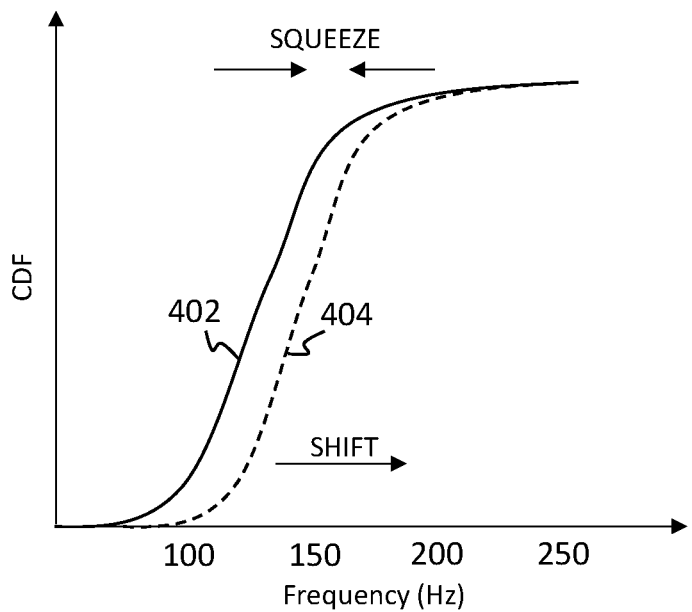
FIG. 4 is a cumulative distribution of fundamental frequencies of speech of a user of varying vocal effort.

FIG. 4 is a graphical illustration showing the change in fundamental frequency F0 due to increased vocal effort over multiple recorded frames of bone-conducted speech. A first cumulative distribution function (CDF) 402 is shown of fundamental frequency F0 of a user over a plurality of speech frames of a bone-conducted speech sample from the user during normal speech. A second cumulative distribution function 404 is shown of fundamental frequency F0 of a user over a plurality of speech frames of a bone-conducted speech sample from the user during speech of increased vocal effort. It can be seen that the distribution of F0 shifts (increases) with increased vocal effort. It can also be seen that the range and standard deviation of distribution of F0 is squeezed (reduces) with increased vocal effort.

Embodiments of the present disclosure utilise the phenomena described above with reference to FIGS. 3 and 4 to enable biometric processes to be performed in a variety of acoustic conditions. For example, embodiments of the present disclosure obtain a measure of an acoustic condition at the headphone 100 worn by the user and utilise this information, in addition to one or more distributions of fundamental frequency F0 of bone-conducted speech obtained at the same time, to perform one or more biometric processes. Thus, F0 values obtained from the same user in different acoustic conditions can be more easily compared when the acoustic condition in which each of the F0 values was obtained is known. Additionally, the noise resilience of bone-conducted speech (obtained via the IMU 108 of the headphone) improves the quality of measurements of F0 obtained from a user's voice.

Figure 5:
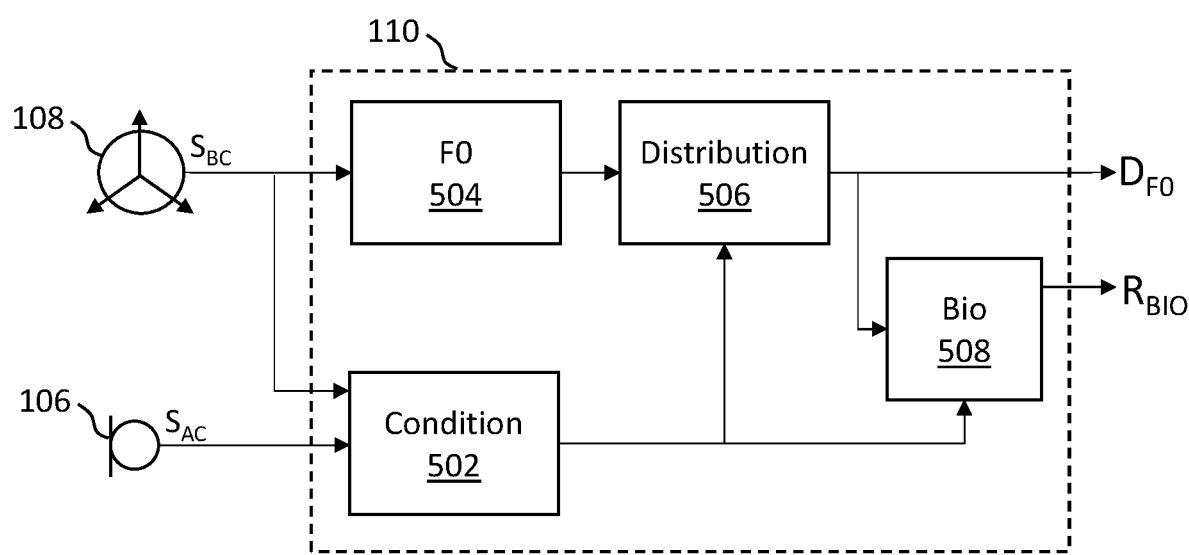
FIG. 5 is an example implementation of the processor of the personal audio device of FIG. 2.

FIG. 5 shows an implementation of the processor 110 in accordance with various embodiments of the present disclosure. The processor 110 comprises an acoustic condition module 504, a F0 module 502, a distribution module 506, and a biometric module 508.

The condition module 502 receives an air-conducted audio signal $S_{AC}$ from the microphone 106. The air-conducted audio signal $S_{AC}$ represents ambient noise at headphone 100 and may comprise air-conducted voice from the user as well as air-conducted noise from third parties and the environment. The condition extract module 502 may also receive a bone-conducted audio signal $S_{BC}$ from the IMU 108 (or other bone conduction sensor).

The condition module 502 is configured to determine one or more acoustic conditions at the headphone 100. The one or more acoustic conditions may comprise noise level, signal-to-noise ratio, or the like.

For example, the condition module 502 may be configured to determine a noise level at the headphone 100 based on the air-conducted audio signal $S_{AC}$. The condition module 502 may be configured to determine the noise level based on the power or amplitude of the air-conducted audio signal $S_{AC}$ in a particular frequency band. The condition module 502 may be configured to determine the noise level based on both of the air-conducted audio signal $S_{AC}$ and the bone-conducted audio signal $S_{BC}$. For instance, the bone-conducted audio signal $S_{BC}$ may be subtracted from the air-conducted audio signal $S_{AC}$ to remove noise associated with the loudspeaker 102. For example, the ratio of the bone-conducted audio signal $S_{BC}$ to the air conducted audio signal $S_{AC}$ may be determined to determine the signal-to-noise ratio (SNR) of the signal. In some embodiments, an SNR of the bone-conducted audio signal $S_{BC}$ may be determined based on the level of or power in the bone-conducted audio signal $S_{BC}$, by assuming that when the level or power of the bone-conducted audio signal $S_{BC}$ is high, that signal is likely to contain more noise than when the level of or power in the bone-conducted audio signal $S_{BC}$ is low.

The one or more acoustic conditions detected by the acoustic condition module 502 may be provided to one or both of the distribution module 506 and the biometric module 508 for further processing, described in more detail below.

The F0 extract module 502 may receive the bone-conducted audio signal $S_{BC}$ from the IMU 108. The bone-conducted audio signal $S_{BC}$ may be received in the digital domain as a plurality of frames or alternatively may be received as an analogue signal and converted to the frequency domain by the F0 module 504 or another module (not shown). The F0 module may obtain a measure of fundamental frequency of the bone-conducted speech signal $S_{BC}$ in each of a plurality of frames of the received bone-conducted speech signal $S_{BC}$. The measured F0 values obtained by the F0 module 504 may then be passed to the distribution module 506. Optionally, the F0 module 504 may obtain measures of other harmonics such as the first or second harmonic of the fundamental frequency (F1, F2) and pass these measurements on to the distribution module 506. Whilst in embodiments described herein fundamental frequency F0 is used for generating one or more distributions, in other embodiments one or more other harmonics (e.g. F1, F2 etc.) may be used to form one or more distribution without departing from the scope of the present disclosure.

It is known that speech can be divided into voiced sounds and unvoiced or voiceless sounds. Speech is composed of phonemes, which are produced by the vocal cords and the vocal tract (which includes the mouth and the lips). Voiced speech signals are produced when the vocal cords vibrate during the pronunciation of a phoneme. Unvoiced speech signals, by contrast, do not entail the use of the vocal cords. Voiced speech signals, such as the vowels /a/, /e/, /i/, /u/, /o/, tend to be louder and/or comprise more power at lower frequencies. Unvoiced speech signals, such as the consonants /p/, /t/, /k/, /s/, /z/, /f/, and /v/, tend to be more abrupt and/or comprise more power at high frequencies. Since vocal harmonics (F0, F1, F2 etc.) are generated by the vocal cords, this shift in F0 is particularly apparent in voiced speech, which is primarily generated by the vocal cords.

In view of the above, in some embodiments, the F0 module 504 may be configured to identify frames of the bone-conducted audio signal $S_{BC}$ and obtain F0 measurements of those frames containing voice. In doing so, only the frames most affected by vocal effort (Lombarding) may be used in the determination of F0. Example voice activity detectors are described in more detail below. The F0 module may use such examples or any other voice activity detector known in the art.

The distribution module 506 may determine one or more distributions of the received F0 measurements received from the F0 module 504. The distribution module 506 may, for example, determine a cumulative distribution function, like that shown in FIG. 4, an empirical distribution function (EDF), a probability distribution function (PDF), or other distribution representing the distribution of F0 values over the plurality of frames of the received bone-conducted audio signal $S_{BC}$ provided to the distribution module 506 from the F0 module 504.

In some embodiments, the distribution module 506 may receive the one or more acoustic conditions output from the condition module 502 and use the acoustic conditions to transform or normalise one or more of the distributions obtained by the distribution module 506. Normalisation or transformation may comprise shifting or transforming the frequency of an F0 distribution based on the level of ambient noise detected by the condition module 502. For example, in high levels of ambient noise, the user may be using more vocal effort to speak over the noise and thus the F0 distribution of their bone-conducted speech may be shifted up in frequency as shown in FIG. 4. Additionally, the F0 distribution may be squeezed, again as shown in FIG. 4. The distribution module 506 may therefore be adjusted to take into account the level of noise (or other acoustic condition) indicated by the condition module 502 and adjust the F0 distribution such that over time and different acoustic conditions, all of the distributions output by the distribution module 506 are comparable with each other. This means that F0 distributions obtained in different acoustic conditions can be used by the biometric module 508 in one or more biometric processes, such as biometric enrolment or authentication. Such compensation may equally be achieved in the biometric module 508 itself, in a similar manner to that described above.

The distribution module 506 may output the one or more F0 distributions (e.g. CDF, EDF, PDF) for further processing. For example, the distribution module 506 may output the one or more F0 distributions to the biometric module 508 for use in one or more biometric processes.

The biometric module 508 may then use the F0 distribution in one or more biometric processes. Such use of F0 distribution in speaker recognition and the like (e.g. biometric enrolment, biometric authentication etc.) is known from US patent publication number US 2020-0082830 A1 (the content of which is hereby incorporated by reference in its entirety) and so will not be described in more detail herein.

The biometric module 508 may then output a biometric result $R_{BIO}$.

Figure 6:
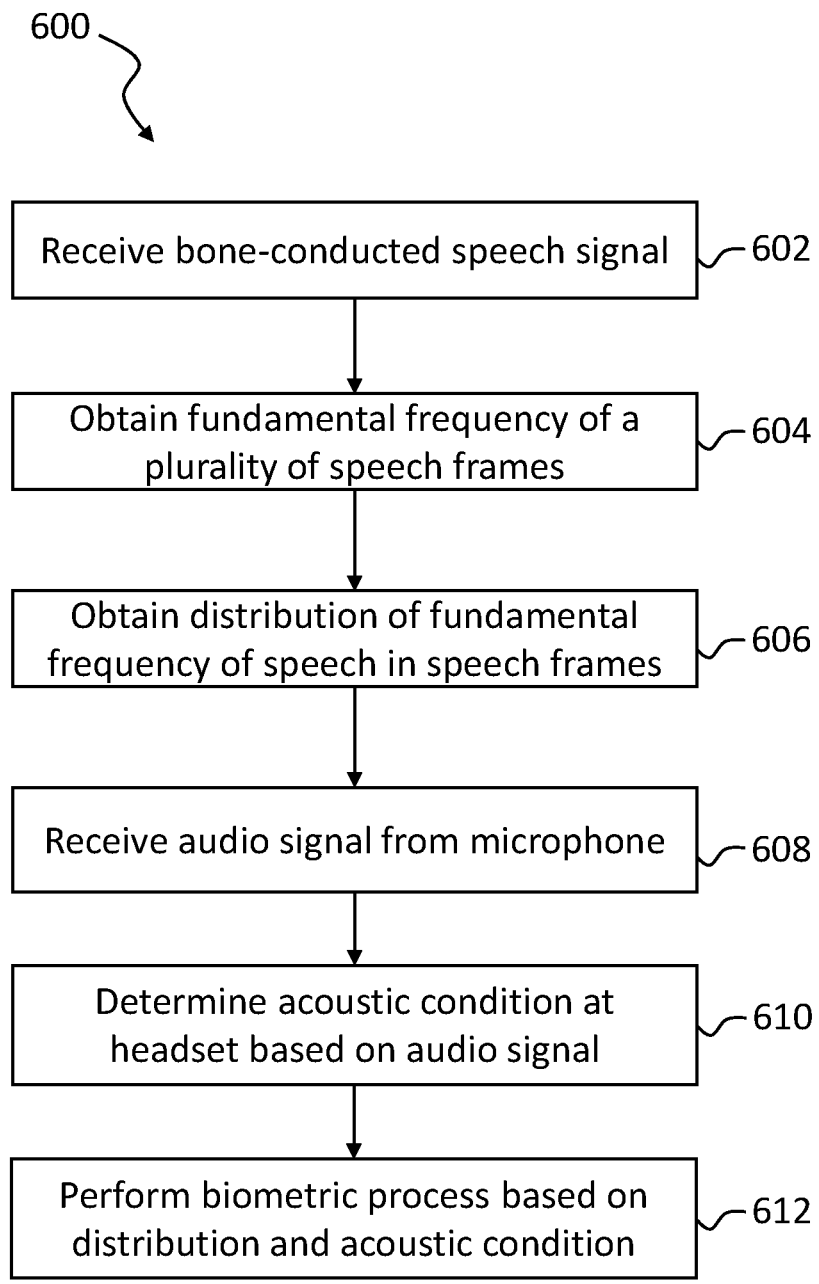
FIG. 6 is a flow diagram illustrating a process according to embodiments of the present disclosure.

FIG. 6 is a flow diagram of a process 600 which may be implemented by the headphone 100 described above.

At step 602 a bone-conducted audio signal $S_{BC}$ may be received, for example from the IMU 108.

At step 604, the fundamental frequency F0 (and optionally other harmonics) are obtained by the F0 module 504 from each of a plurality of frames of the received bone-conducted audio signal $S_{BC}$. The F0 module 504 may determine which frames of the received bone-conducted audio signal $S_{BC}$ comprise speech, and in particular voiced speech. The fundamental frequencies F0 obtained by the F0 module 504 may then be passed to the distribution module 506.

At step 606, the distribution module may obtain one or more distributions of fundamental frequency of speech in the speech frames of the bone-conducted audio signal $S_{BC}$ based on F0 values received from the F0 module 504.

At step 608, which may be performed before, after or at the same time as steps 602 to 606 described above, an air-conducted audio signal $S_{AC}$ may be received, for example from the microphone 106 of the headphone 100.

At step 610, an acoustic condition at the headphone 100 may be determined based on the received air-conducted audio signal $S_{AC}$. For example, the acoustic condition may be a noise level, or a signal-to-noise ratio or another condition which may affect the way in which the user speaks, e.g. causing the user's vocal effort to change.

At step 612 a biometric process may be performed based on the one or more distributions for fundamental frequency and the one or more acoustic conditions. For example, the one or more acoustic conditions may be associated with a distribution or a set of distributions. For example, one or more distributions may be normalised or adjusted to take into account the acoustic condition at the headphone 100. In some embodiments, the biometric module 508 may take into account the one or more acoustic conditions when using the one or more F0 distributions for a biometric process. Alternatively, if a distribution is normalised or adjusted prior to being provided to performance of the biometric process, then the biometric process may be performed based on the adjusted distribution.

In some embodiments, the headphone 100 or an associated host device may be configured to detect whether the headphone 100 (or personal audio device) is being worn by the user. Additionally, as mentioned above, the headphone 100 or an associated host device may be configured to detect whether the user of the headphone 100 is speaking. Embodiments of the present disclosure may utilise these functions of the headphone 100 and/or associated devices to toggle the collection of fundamental frequency data (F0 values) for use in one or more biometric processes. For example, embodiments may determine that the headphone 100 is being worn by the user and, if the headphone 100 is being worn, monitor for periods in which the user of the headphone 100 is speaking. During those periods, when the headphone 100 is being worn and the user is speaking, a measure of fundamental frequency of bone-conducted speech from the user may be obtained (as described above with reference to FIGS. 5 and 6). Once a predetermined threshold of F0 values have been obtained a distribution of those F0 may be obtained and used in a biometric process.

Figure 7:
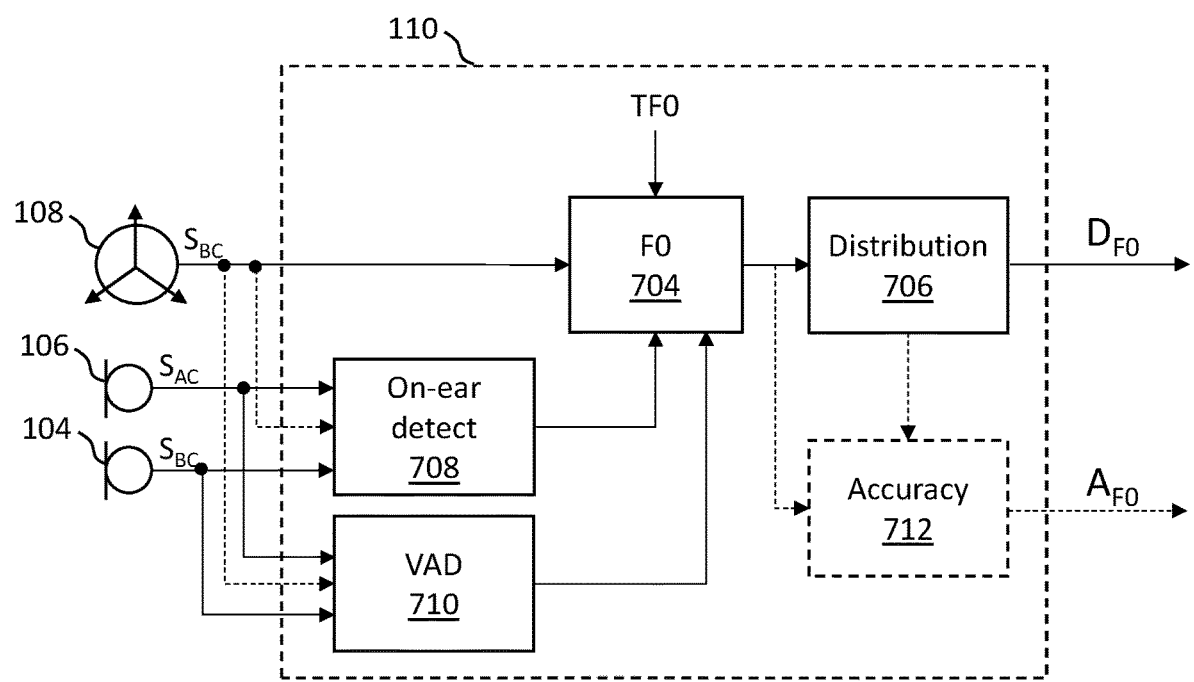
FIG. 7 is an example implementation of the processor of the personal audio device of FIG. 2.

FIG. 7 illustrates an example implementation of the processor 110 in accordance with various embodiments of the present disclosure which may be implemented separately or in combination with the implementation shown in FIG. 5. The processor 110 comprises an F0 module 704 and a distribution module 706 which may have some or all of the functionality of the F0 module 504 and distribution module 506 of FIG. 5 as well as any additional functionality described below. The processor 110 further comprises an on-ear detect module 708, a voice activity detect (VAD) module 710 and an (optional) accuracy module 712.

The on-ear detect module 708 is configured to detect whether the headphone 100 is on or in the ear (or more generally whether the headphone 100 is being worn). The on-ear detect module 708 may output an on-ear detect signal indicating whether or not the headphone is being worn (binary) and/or indicating a likelihood that the headphone 100 is being worn (or the personal audio device is being worn). The on-ear detect module 708 may receive an air-conduction signal $S_{AC}$ from the external microphone 106. The on-ear detect module 708 may additionally or alternatively receive a bone-conduction signal $S_{BC}$ which may be obtained from the IMU 108 or the internal microphone 104, or a mixture of both. The on-ear detect module 708 may determine that the headphone 100 is on or in the ear by determining a power or amplitude of the bone-conducted audio signal $S_{BC}$. For example, when the headphone 100 is located in the ear, the bone-conducted audio signal $S_{BC}$ received at the internal microphone 104 may have a relatively low power when the user is not speaking (due to occlusion of the ear by the headphone 100 and thus a reduction in ambient noise reaching the internal microphone). In another example, the on-ear detect module 708 may apply an acoustic stimulus via the loudspeaker 102 and detect a response in the bone-conducted audio signal $S_{BC}$ picked up by the internal microphone 104 or the IMU 108. The response may be indicative of the headphone 100 being worn.

In some embodiments, the on-ear detect module 708 determines that the headphone 100 is being worn by comparing the air-conducted audio signal $S_{AC}$ to the bone-conducted audio signal $S_{BC}$. For example, if the headphone 100 is in the ear and the user is not speaking, the sound level or power in the bone-conducted audio signal $S_{BC}$ is likely to be lower than that in the air-conducted audio signal $S_{AC}$ due to partial or full occlusion of the ear by the headphone 100. Additionally or alternatively, any known method of detecting that the headphone 100 is being worn by the user may be used to determine that the headphone 100 is being worn, such as pressure switches, temperature, heartbeat or the like picked up by one or more sensors embodied in the headphone 100 (or personal audio device).

The VAD module 104 is configured to detect whether the user is speaking. The VAD module 104 receives the air-conducted audio signal $S_{AC}$ and the bone-conducted audio signal $S_{BC}$ from the internal microphone 104 or the IMU 108. To determine whether the user is speaking, the VAD module 104 may determine a correlation between the air-conducted audio signal $S_{AC}$ and the bone-conducted audio signal $S_{BC}$. Such a correlation may be indicative of the user speaking as opposed to a third party speaking near to the headphone 100 or to ambient noise at the headphone 100. Additionally or alternatively, any known method of detecting that the user of the headphone 100 is speaking may be used to determine that the user is speaking. The VAD module 104 may output a voice activity signal to the F0 module 704 indicating that the user is speaking and/or indicating a probability that the user is speaking.

The F0 module 704 is configured to obtain a measure of fundamental frequency F0 (and optionally harmonics thereof) as described above with reference to the F0 module 504 of FIG. 5. In addition, the F0 module is configured to receive the on-ear detect signal from the on-ear detect module 708 and the voice activity signal from the VAD 710. The F0 module 704 is configured to receive and process the bone-conducted audio signal $S_{BC}$ on determination that the headphone 100 is being worn by the user, for example based on the on-ear detect signal received from the on-ear detect module 708. The F0 module 704 may then obtain a measure of fundamental frequency F0 (an F0 value) for frames of the bone-conducted audio signal $S_{BC}$ determined to contain speech of the user, for example based on the voice activity signal received from the VAD module 710.

The F0 module 704 may continue to obtain F0 values until it is determined that a predetermined threshold TF0 of F0 values have been obtained for the user. The threshold TF0 may be provided to the F0 module 704 from memory or from another module of the processor 110 (not shown). In some embodiments, the F0 may be set based on a biometric process for which the F0 values are to be used. For example, for a biometric process requiring a low level of security clearance (play a song, call a contact etc.), the threshold TF0 may be set relatively low when compared to a biometric process requiring a high level of security clearance (access to a bank account, payment transaction etc.).

In some embodiments, the threshold TF0 may be set based on the number of audio samples received by the F0 module 704. For example, it may be assumed that the distribution will have a particular form (e.g. Gaussian). In which case, as the number of received audio samples increase, the threshold TF0 may become a function of the assumed distribution. For example, the obtained distribution may be compared to an assumed (e.g. Gaussian) distribution. The closer the distribution to the assumed distribution, the more accurate the set of F0 values collected. Thus, in some embodiments, an initial distribution may be determined and compared with a template distribution. Embodiments of the present disclosure may implement a Neyman-Pearson Lemma or Kolmogorov-Smirnov test to compare the distribution to the assumed or template distribution.

The F0 module 704 may then output the F0 values to the distribution module 706 which is then configured to generate and output one or more distributions representing the fundamental frequencies (F0 values) provided to the distribution module 706 by the F0 module 704 in a manner similar to that described above with reference to the F0 module 504 of FIG. 5. By triggering capture of F0 values based on detecting that the headphone 100 is being worn and that the user is speaking, a more accurate estimate of F0 distribution for speech of the user can be obtained.

As mentioned above, optionally, the accuracy module 712 may be provided to output an indication of the level of accuracy of the F0 distribution being provided by the distribution module 706. In some embodiments, the accuracy module 712 may receive from the F0 module 704 an indication of the number of F0 values being provided to the distribution module 706 for forming one or more of the distributions. Additionally or alternatively, the distribution module 706 may provide an indication to the accuracy module 712 regarding the number of F0 values upon which one or more distributions being output by the distribution module 706 is based.

The accuracy module 712 may then determine, based on the indication received from the F0 module 704 and/or the distribution module 706 an accuracy of the distribution being output by the distribution module 706 and output that accuracy level $A_{F0}$. The accuracy level $AF0$ may be used by a biometric process to determine how the F0 distribution is used. For example, if the accuracy level $A_{F0}$ is high, the F0 distribution may be used in a more secure biometric process. On the contrary, if the accuracy level $A_{F0}$ is low, use of the F0 distribution may be limited to biometric processes requiring a relatively low security. In some embodiments, the accuracy may be determined based on a comparison of each of the distributions to an assumed ideal or template distribution, for example using a Neyman-Pearson Lemma or Kolmogorov-Smirnov test as described above with reference to the F0 module 704.

Figure 8:
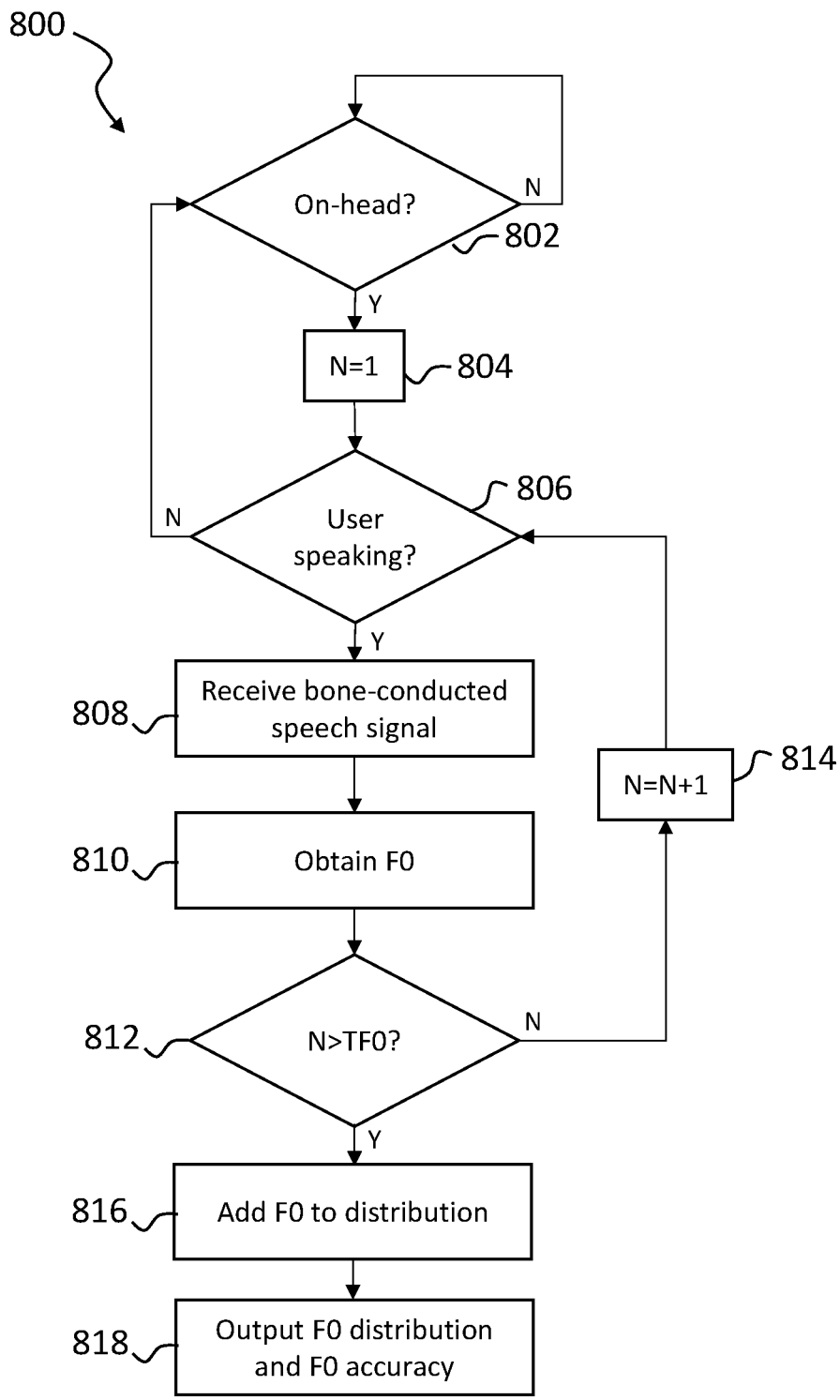
FIG. 8 is a flow diagram illustrating a process according to embodiments of the present disclosure.

FIG. 8 is a flow diagram of an example process 800 which may be implemented by the headphone 100 described above.

At step 802, a determination may be made as to whether the headphone 100 is being worn (i.e. is on the head of the user). If it is determined that the headphone 100 is not being worn, step 802 is repeated until it is determined that the headphone 100 is being worn, at which point, at step 804 a counter N is set to 1.

At step 806, a determination may be made as to whether the user is speaking. If it is determined that the user is not speaking, the process may return back to step 802 above or alternatively, step 806 may be repeated until it is determined that the user is speaking.

On determination that the user is speaking, at step 808, a bone-conducted speech signal may be received and, at step 810, a measure of F0 may be made for frames of the received bone-conducted audio signal containing speech of the user.

At step 812, if it is determined that the number of F0 values is less than a threshold TF0, then the counter is incremented at step 814 and the process 800 returns to step 806 to confirm whether the user is still speaking. Returning to step 812, if it is determined that the number of F0 values exceeds the threshold TF0 then, at step 816, one or more distributions of F0 are generated.

At step 818, the one or more F0 distributions are output. Optionally an accuracy of the F0 distribution is also output at step 818.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method for obtaining biometric data using a headset comprising a bone-conduction sensor, the method comprising:
   detecting that the headset is being worn by a user;
   detecting that the user is speaking;
   while the headset is being worn and the user is speaking:
      receive a first signal from the bone-conduction sensor representing bone-conducted speech of the user;
      obtain a measure of a fundamental frequency of the bone-conducted speech of the user in each of a plurality of speech frames of the first signal; and
   on determining that a threshold number of speech frames containing bone-conducted speech of the user have been obtained:
      obtain a first distribution of the fundamental frequency of the bone-conducted speech in the plurality of speech frames; and
      output the first distribution for use in a biometric process.

2. The method of claim 1, further comprising:
   determining a degree of accuracy of the first distribution based on the number of speech frames contained in the first distribution.

3. The method of claim 2, further comprising:
   determining the degree of accuracy of the first distribution based on an acoustic condition at the headset.

4. The method of claim 2, further comprising:
   outputting the degree of accuracy with the first distribution.

5. The method of claim 1, further comprising:
   updating the first distribution while the headset is being worn and the user is speaking; and
   outputting the updated first distribution.

6. The method of claim 1, further comprising:
   determining which frames of first signal contain voiced speech; and
   obtaining the measure of the fundamental frequency of the speech of the user from the frames that contain voiced speech.

7. The method of claim 1, further comprising:
   performing the biometric process.

8. The method of claim 1, wherein the bone-conduction sensor comprises an inertial measurement unit (IMU) or a contact microphone.

9. A device comprising:
   an input for receiving, from a bone-conduction sensor, a first signal representing bone-conducted speech of the user; and
   one or more processors configured to:
      detecting that the headset is being worn by a user;
      detecting that the user is speaking;
      while the headset is being worn and the user is speaking:
         obtain a measure of a fundamental frequency of the bone-conducted speech of the user in each of a plurality of speech frames of the first signal; and
         on determining that a threshold number of speech frames contain bone-conducted speech of the user have been obtained:
            obtain a first distribution of the fundamental frequency of the bone-conducted speech in the plurality of speech frames; and
            output the first distribution for use in a biometric process.

10. The device of claim 9, wherein the one or more processors are configured to:
    determine a degree of accuracy of the first distribution based on the number of speech frames contained in the first distribution.

11. The device of claim 10, wherein the one or more processors are configured to:
    determine the degree of accuracy of the first distribution based on an acoustic condition at the headset.

12. The device of claim 9, wherein the one or more processors are configured to:
    output the degree of accuracy with the first distribution.

13. The device of claim 9, wherein the one or more processors are configured to:
    update the first distribution while the headset is being worn and the user is speaking; and
    output the updated first distribution.

14. The device of claim 9, wherein the one or more processors is further configured to perform the biometric process.

15. The device of claim 9, comprising the bone-conduction sensor.

16. The device of claim 15, wherein the bone-conduction sensor comprises an inertial measurement unit (IMU) or a contact microphone.

17. A non-transitory machine-readable medium storing instructions which, when executed by processing circuitry, cause an electronic apparatus to implement a method according to claim 1.

* * * * *